US007096013B1

(12) United States Patent
Trandai et al.

(10) Patent No.: US 7,096,013 B1
(45) Date of Patent: Aug. 22, 2006

(54) METHOD FOR OPERATING IN AN 800 MHZ TRUNKED RADIO COMMUNICATIONS SYSTEM BY MAPPING CHANNELS TO FREQUENCIES

(75) Inventors: Tanhoa Trandai, Arlington Heights, IL (US); Daniel J. McDonald, Cary, IL (US); Christopher H. Wilson, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/215,172

(22) Filed: Aug. 30, 2005

(51) Int. Cl.
*H04Q 7/20* (2006.01)
(52) U.S. Cl. .................... 455/426.1; 455/450
(58) Field of Classification Search ............ 455/426.1, 455/434, 450, 451, 452.1, 452.2, 446, 518, 455/509, 62, 71, 179.1
See application file for complete search history.

(56) References Cited

U.S. PATENT DOCUMENTS

| | | | |
|---|---|---|---|
| 4,646,345 A | 2/1987 | Zdunek et al. | |
| 4,716,407 A | 12/1987 | Borras et al. | |
| 4,723,264 A | 2/1988 | Sasuta et al. | |
| 4,870,408 A | 9/1989 | Zdunek et al. | |
| 5,225,843 A | 7/1993 | Thompson | |
| 5,361,401 A | 11/1994 | Pirillo | |
| 5,956,648 A * | 9/1999 | Brennan et al. | ............ 455/518 |
| 6,188,979 B1 | 2/2001 | Ashley | |
| 6,252,910 B1 | 6/2001 | West et al. | |
| 6,304,756 B1 | 10/2001 | Hebeler et al. | |
| 6,308,050 B1 | 10/2001 | Eklof | |
| 6,519,472 B1 * | 2/2003 | Brennan et al. | ............ 455/518 |
| 6,842,630 B1 | 1/2005 | Periyalwar | |
| 6,922,135 B1 | 7/2005 | Abraham | |
| 2004/0018832 A1 * | 1/2004 | Dunham | ................. 455/422.1 |

OTHER PUBLICATIONS

TIA TSB-102.AABC, "Project 25 Trunking Control Channel Messages New Technology Standards Project Digital Radio Technical Standards TR-8.10 Subcomittee", May 31, 1996.
TIA TSB-102.AABD, "Project 25 Trunking Procedures New Technology Standards Project Digital Radio Technical Standards", Oct. 1997.

* cited by examiner

*Primary Examiner*—Erika A. Gary
(74) *Attorney, Agent, or Firm*—Indira Saladi

(57) ABSTRACT

A receiving device in a trunked radio communications system determines transmit and receive frequencies by a mapping. The receiving device receives a voice channel number, wherein the voice channel number is communicated in an outbound signaling message defined by Motorola's 3600-baud radio trunking protocol. The receiving device tunes to about a transmit frequency of 806.0250 MHz, if the voice channel number is 440; tunes to about a transmit frequency of 806.0500 MHz, if the voice channel number is 441; tunes to about a transmit frequency of 806.0750 MHz, if the voice channel number is 442; etc. The receiving devices tunes to about a receive frequency of 852.5250 MHz, if the voice channel number is 500; tunes to about a receive frequency of 852.5500 MHz, if the voice channel number is 501; tunes to about a receive frequency of 852.5750 MHz, if the voice channel number is 502; etc.

20 Claims, 2 Drawing Sheets

METHOD FOR OPERATING IN AN 800 MHZ TRUNKED RADIO COMMUNICATIONS SYSTEM BY MAPPING CHANNELS TO FREQUENCIES

FIELD OF THE INVENTION

The present invention relates generally to trunked radio communications systems and more specifically to the field of operating in an 800 MHz trunked radio communications systems by mapping frequencies to channels.

BACKGROUND OF THE INVENTION

A long standing problem with wireless communications is the need to maximize spectrum efficiency. Spectrum efficiency refers to the most efficient use of the limited bandwidth that is set aside for a given type of wireless communications. For instance, in the United States, the Federal Communications Commission (FCC) has set aside the portions of the frequency spectrum from 851 to 869 MHz and from 806 to 824 MHz for trunked private two-way radio communications (as used herein, "trunked radio communications"). The first portion of the spectrum is reserved for transmissions by infrastructure in the trunked radio communications system and the second portion of the spectrum is reserved for transmissions by subscribers in the trunked radio communications system. The absolute frequencies of the frequency spectrum are allocated by the FCC and divided into channels (associated with channel numbers) by an operator of the infrastructure.

When the FCC changes allocations to the frequency spectrum the mapping between the channels and the absolute frequencies may need to also change to accommodate the changes in allocation. For example, the FCC has changed allocations to the 800 MHz spectrum, where the National Public Safety Planning Advisory Committee (NPSPAC) licensees have all been consolidated to operate in the 806 to 809 MHz spectrum. In such a situation, the time and effort required to perform the mapping between the channels and the absolute frequencies is great. Further, once the mapping is performed, the subscribers need to be informed about the new mapping so that the subscribers can utilize the mapping to use the trunked radio communications system for communications.

Generally, subscribers of the trunked radio communications system are assigned a channel for the subscriber to utilize for a voice call with other subscribers in the trunked radio communications system. Once the subscriber receives its channel assignment, the subscriber must translate the assigned channel to an absolute frequency. When allocations to the frequency spectrum change, the radio may need to perform a new calculation that takes into account the mapping that was performed between channels and absolute frequencies. Further, if the frequency separation between adjacent channels is smaller than previously used, then the subscriber needs to account for the smaller separation when the subscriber utilizes the channel for communications. If the subscriber does not account for the smaller separation, then the subscriber may interfere with communications in adjacent channels.

Thus, there is a need for a new method for operating in an 800 MHz trunked radio communications system.

BRIEF DESCRIPTION OF THE FIGURES

The present invention is illustrated by way of example and not limitation in the accompanying figures, in which like references indicate similar elements, and in which.

Figure 1:
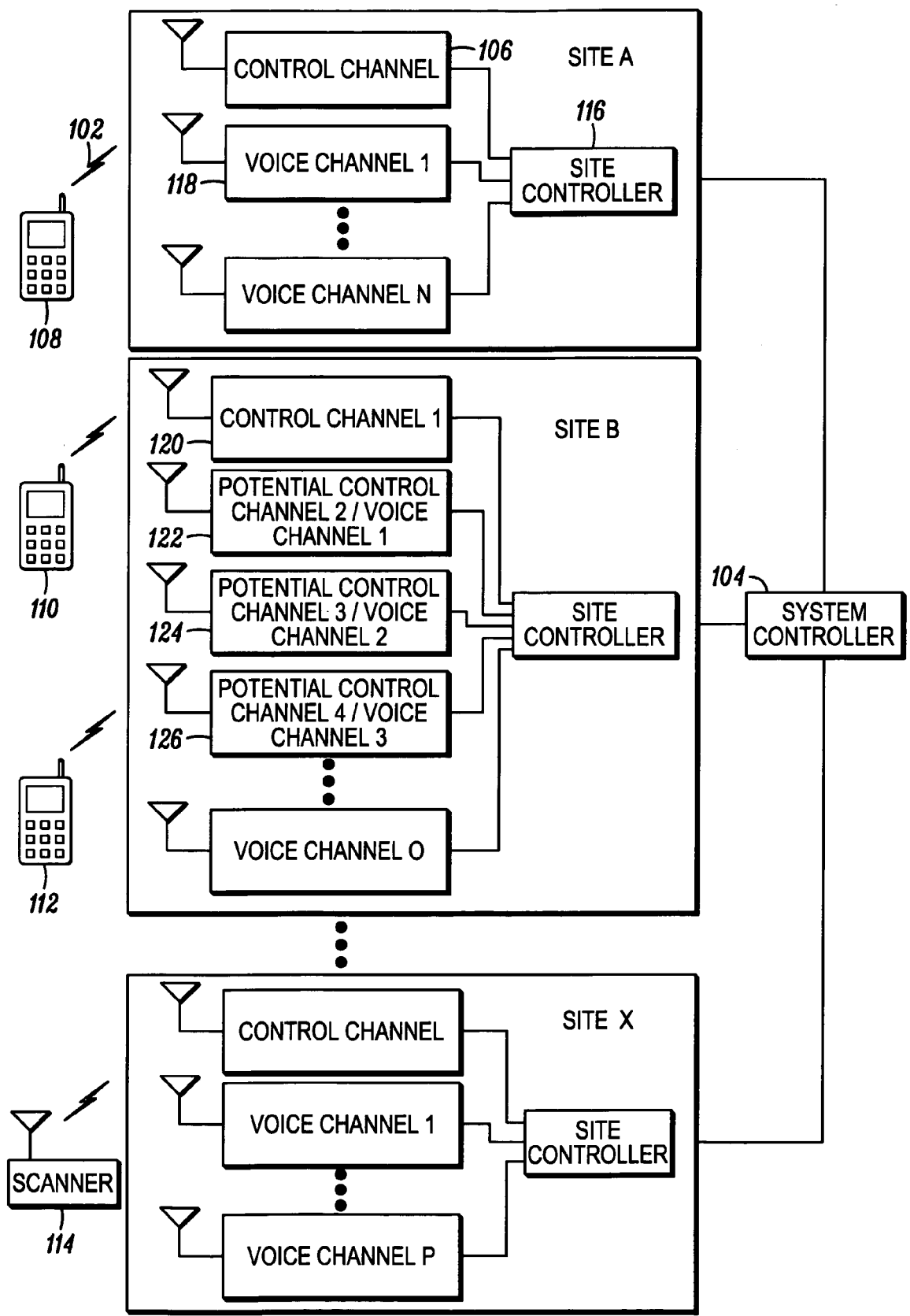
FIG. 1 is a block diagram illustrating a typical trunked communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 illustrates a block diagram of a trunked radio communications system 100 that may employ an embodiment of the present invention. Typically, a trunked radio communications system 100 comprises at least one site, e.g. site A, and a plurality of receiving devices, e.g. receiving devices 108–114, so that the receiving devices can receive communications over a radio frequency (RF) resource 102. A site, e.g. site A, typically comprises at least one control channel, a number of voice channels, and a site controller that coordinates access to the RF resource 102 for the receiving devices associated with the site. For example, in FIG. 1, the site controller 116 for site A coordinates access to the RF resource 102 for receiving device 108.

As is known in the art, the RF resource 102 is a transmission medium. In one embodiment, the RF resource 102 comprises RF spectrum in the 800 MHz band. As such, the trunked radio communications system 100 operates in the 800 MHz spectrum.

As is known to one of ordinary skill in the art, the control and voice channels in each site are implemented using "repeaters," where a repeater is an electronic device that receives a RF signal and retransmits a RF signal at a higher power. Further, there is a repeater for each channel, whether voice or control, in the site. Thus, if there are 28 channels in site A, then there are 28 repeaters. Further, each site has a number of control channels and a number of voice channels, where each site has at least one control channel. As shown in FIG. 1, site A has one control channel 106 and N voice channels, where N represents the number of voice channels in site A. As is known to one of ordinary skill in the art, each site may have up to 4 control channels (with only 1 control channel active at one time and the others are potential control channels) and may have up to 27 voice channels (as such, N may be any number up to 27). Thus, illustrating only one control channel 106 for site A and one control channel 120 for site B in FIG. 1 is not meant to be a limitation on an embodiment of the present invention. For example, backup control channels for site B, namely potential control channels 122, 124, 126, are shown for ease in understanding. In any case, the number of control channels and the number of voice channels in one site together may not exceed 28. In any case, a site is defined by control channels, voice channels, and a site controller where the site interfaces with the receiving devices to carry the communications of the trunked radio communications system 100.

FIG. 1 illustrates a plurality of sites, site A, site B, . . . and site X, where X represents the number of sites in the trunked radio communications system 100. An embodiment of the present invention is contemplated to work in a trunked radio communications system 100 with any number of sites. Further, an embodiment of the present invention is contemplated to work in a trunked radio communications system with only one site, e.g. site A.

In a trunked radio communications system 100 of at least two sites, a system controller 104 acts as the system coordinator and is responsible for assigning subscribers 108, 110, 112 to different voice channels at different sites, e.g. site A, site B, so that the subscribers may communicate amongst each other. In a trunked radio communications system 100 of at least two sites, the site controller, e.g. site controller 116, functions to forward control channel messages to the system controller 104. However, in a single site system, the site controller, e.g. site controller 116, performs the functionality performed by the system controller 104. Thus, as used henceforth, the term system controller 104 is used to encompass the functionality that may be performed by either the site controller (alone) or the system controller (in conjunction with the site controller) where the functionality is described as to forward control channel messages so that the subscribers of the trunked radio communications system 100 may communicate amongst each other.

The system controller 104 is also responsible for knowing where each of the subscribers are located (i.e. what voice channel and/or what site) and for controlling other features typically found in a modern trunked communication system (e.g. handling phone patches, coordinating groups of radios in emergency situations, etc.). Further, the system controller 104 may comprise a database for keeping track of the subscribers. Typically, the database comprises information relating to keeping track of subscribers and information relating to the subscribers, such as IDs, talkgroup identifiers, and site location. For example, the database may contain information of subscriber 108 such as the subscriber's ID and that subscriber 108 is active in a call on voice channel 118. Further, the information in the database may be updated as the subscribers 108, 110, 112 move in the trunked radio communications system 100 from one site to another site. Further yet, the typical system controller 104 includes a main processing unit such as a computer with appropriate control software that controls the operation of system controller 104. Also normally co-located with the system controller 104 is a dispatch center with a dispatch console that allows dispatchers to communicate with the system's subscribers 108, 110, 112. In a single site system, the dispatch center may be co-located with the site controller 116.

The receiving devices 108–114 are typically mobile or portable devices, such as subscribers 108, 110, 112 and scanner 114. In one embodiment, the subscribers 108, 110, 112 are also known in the art as "radios," and can send and receive communications. In one embodiment, the scanner 114 is known by a number of names, including the term "receiver," "scanner device," and the like. In one embodiment, the scanner 114 is only able to receive communications and not able to send communications. In any case, the receiving devices listen to communications of the trunked radio communications system 100. Even though the terms "receiving device" and "subscriber" are both used in this description, the term "receiving device" refers to "subscribers," e.g. subscribers 108, 110, 112 when referring to both receiving and transmitting operations and refers to "scanners," e.g. scanner 114, when referring to only receiving operations.

Communications between the subscribers 108, 110, 112 and the system controller 104 can be of two directions, inbound and outbound. The signals that are sent from the system controller 104 to the subscribers 108, 110, 112 over the control channel 106 are typically called outbound signaling communications. In a specific embodiment, the outbound signaling is termed an Outbound Signaling Word (OSW). The control signals going from subscribers 108, 110, 112 to the system controller 104 are sent over the control channel 106 and are typically called inbound signaling communications. In a specific embodiment, the inbound signaling is termed an Inbound Signaling Word (ISW).

Figure 2:
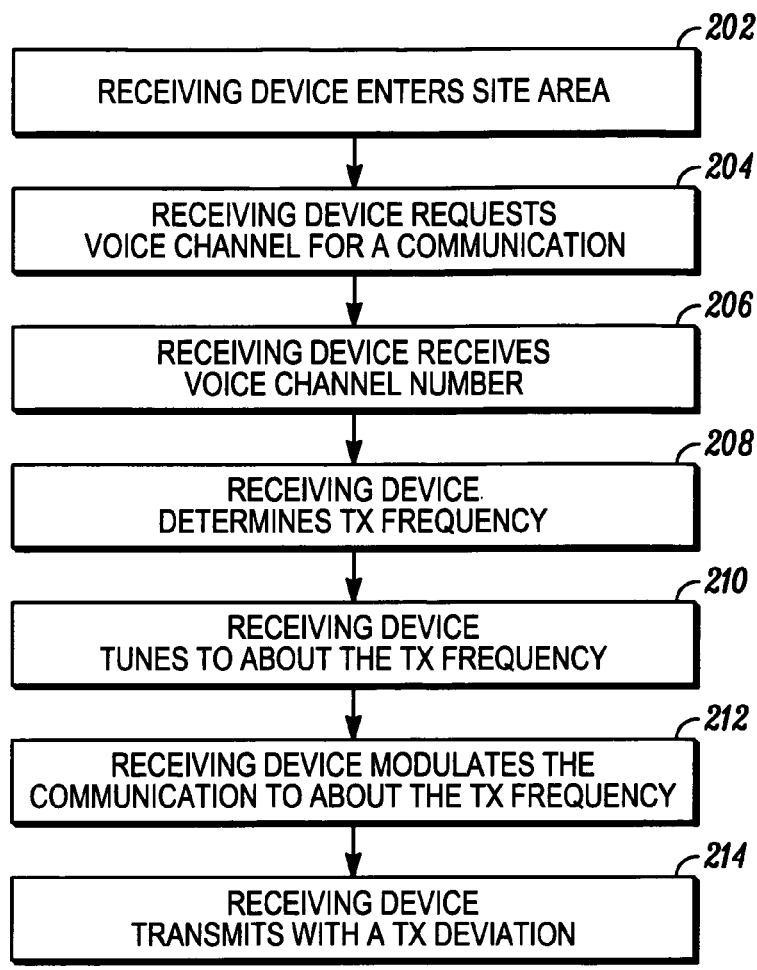
FIG. 2 is a flow diagram illustrating a method for operating in an 800 MHz in a trunked radio communications system in accordance with an embodiment of the present invention.

Referring now to FIG. 2, a flow diagram showing the steps taken by one of the receiving devices 108–114 in accordance with one embodiment of the invention is shown. At step 202, an example of a typical trunked communication begins when a receiving device (e.g. subscriber 108) enters a site (e.g. site A) coverage area and listens to a control channel of the site. In one embodiment, the receiving device receives control channel signaling that is defined by Motorola's 3600-baud radio trunking protocol. As such, the receiving device receives OSWs to establish communication with the site.

At step 204, the receiving device requests a voice channel for communicating with at least one other receiving device in the trunked communication system. In one embodiment, the receiving device may request a voice channel for a voice call by initiating a communication by pressing PTT (push to talk) which sends a request for a voice channel (e.g. 118) to the system controller 104. In such an embodiment, the request is an ISW that is defined by Motorola's radio trunking protocol and includes information about the receiving device. Further, the ISW may also include information about a talkgroup that the receiving device is associated with. Once the request for a voice channel is received by the system controller, the system controller assigns a voice channel (e.g. voice channel 118 on site A) to the receiving device. In one embodiment, the system controller assigns a voice channel and sends an OSW informing the receiving device of the assigned voice channel. Further, if the receiving device requests a communication (e.g. a talkgroup call) that spans more than one site, then the system controller assigns voice channels at each of the sites encompassed by the communication.

Figure 3:
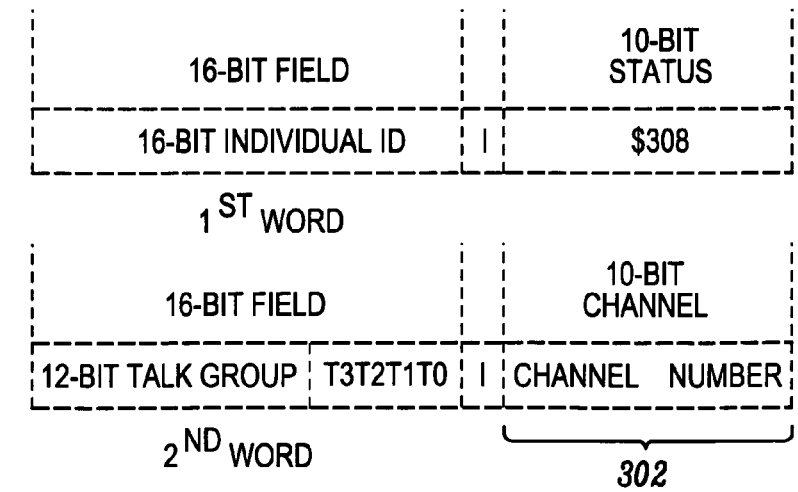
FIG. 3 is an example group call grant OSW in accordance with an embodiment of the present invention.

At step 206, the receiving device receives the assigned voice channel. In one embodiment, receiving the assigned voice channel means to receive an outbound signaling message from the system controller with a voice channel number. In such an embodiment, the outbound signaling message is a channel grant OSW from the system controller (e.g. via the site controller at the site that the receiving device is within coverage of) that is defined by Motorola's 3600-baud radio trunking protocol. In one embodiment, the channel grant OSW is a group call grant OSW 300 as illustrated in FIG. 3. As such, the assigned voice channel number is signaled via the 10-bit channel field 302.

At step 208, once the receiving device receives the assigned voice channel number, the receiving device determines a transmit frequency that relates to the assigned voice channel. In one embodiment, if the receiving device receives an assigned voice channel number that is between 440 and 559, then the receiving device performs the following calculation to arrive at the transmit frequency.

$$TX\ frequency = Base\ Frequency + [(N-440)*Channel\ Spacing]$$

In the above equation, the Base Frequency relates to 806.0250 MHz and the Channel Spacing relates to 25,000 Hz.

As used above, "relates to" means that the relationship between the Base Frequency and the number 806.0250 MHz is such that mathematical operations may be performed on the Base Frequency so that the Base Frequency represents 806.0250 MHz. As is known to one of ordinary skill in the art, storing a lesser or greater number than 806.0250 and performing a calculation to arrive at 806.0250 MHz is considered to be equivalent to storing the number 806.0250. For example, storing 400, multiplying by 2, adding 6, and adding 0.0250 is considered to be related to the base frequency of 806.0250. In any case, the Base Frequency may be arrived at by any such mathematical operations. Further, the Base Frequency may be stored in any electronic format. For example, the Base Frequency may be stored in hexadecimal format. In any case, as is known to one of ordinary skill in the art, such storage formats are considered equivalent.

In the above equation, the Channel Spacing relates to the bandwidth of the channel where the center frequency of a first channel is separated by a channel spacing from the center frequency of a second channel. For channels between 440 and 559, the channel spacing relates to 25 kHz.

As used above, "relates to" means that the relationship between the Channel Spacing and the number 25,000 is such that mathematical operations may be performed on the Channel Spacing so that the Channel Spacing represents the bandwidth of the channel. As is known to one of ordinary skill in the art, storing a lesser or greater number than 25,000 and performing a calculation to arrive at 25 kHz is considered to be equivalent to storing the number 25,000. In any case, the Channel Spacing may be arrived at by any such mathematical operations. Further, the Channel Spacing may be stored in any electronic format. For example, the Channel Spacing may be stored in hexadecimal format. In any case, as is known to one of ordinary skill in the art, such storage formats are considered equivalent.

In the above equation, N represents the assigned voice channel number that the receiving device received from the system controller. Utilizing the above formula, the receiving device is able to determine a transmit frequency (TX Frequency, as above) for a given assigned voice channel. For example, if the receiving device is assigned a voice channel of 450, then the receiving device determines the transmit frequency as follows.

$$TX\ Frequency = Base\ Frequency + [(450-440)*Channel\ Spacing]$$

Substituting the value of the Base Frequency (806.0250 MHz) and the Channel Spacing (25 kHz) yields a TX Frequency of 806.2750 MHz.

In another embodiment, the receiving device performs a look-up in a list, e.g. stored in memory in the receiving device, that maps voice channel numbers to TX frequencies to determine the TX frequency. In such an embodiment, each TX frequency may be stored in hexadecimal format in the receiving device. In any case, the receiving device performs a mapping as follows in one embodiment:

| Channel Number | TX Frequency (MHz) |
|---|---|
| 440 | 806.0250 |
| 441 | 806.0500 |
| 442 | 806.0750 |
| 443 | 806.1000 |
| 444 | 806.1250 |
| 445 | 806.1500 |
| 446 | 806.1750 |
| 447 | 806.2000 |
| 448 | 806.2250 |
| 449 | 806.2500 |
| 450 | 806.2750 |
| 451 | 806.3000 |
| 452 | 806.3250 |
| 453 | 806.3500 |
| 454 | 806.3750 |

In any case, the receiving device performs a mapping as follows in a second embodiment:

| Channel Number | TX Frequency (MHz) |
|---|---|
| 470 | 806.7750 |
| 471 | 806.8000 |
| 472 | 806.8250 |
| 473 | 806.8500 |
| 474 | 806.8750 |
| 475 | 806.9000 |
| 476 | 806.9250 |
| 477 | 806.9500 |
| 478 | 806.9750 |
| 479 | 807.0000 |
| 480 | 807.0250 |
| 481 | 807.0500 |
| 482 | 807.0750 |
| 483 | 807.1000 |
| 484 | 807.1250 |

In any case, the receiving device performs a mapping as follows in a third embodiment:

| Channel Number | TX Frequency (MHz) |
|---|---|
| 500 | 807.5250 |
| 501 | 807.5500 |
| 502 | 807.5750 |
| 503 | 807.6000 |
| 504 | 807.6250 |
| 505 | 807.6500 |
| 506 | 807.6750 |
| 507 | 807.7000 |
| 508 | 807.7250 |
| 509 | 807.7500 |
| 510 | 807.7750 |
| 511 | 807.8000 |
| 512 | 807.8250 |
| 513 | 807.8500 |
| 514 | 807.8750 |

Whether the receiving device performs a mathematical calculation or performs a look-up in, for example, a table, the mapping between voice channel numbers and the TX frequencies is such that the transmit frequency=806.0250 MHz+[(the voice channel number−440)*25,000 Hz].

At Step 210, the receiving device tunes its transmitter to about the TX frequency (also called the carrier frequency). As is known to one of ordinary skill in the art, tuning to a frequency means to stabilize the synthesizer to about the TX frequency. Further, as used herein, the term "about" is used to represent a variance in the receiving device's capability to stabilize the synthesizer at exactly the TX frequency.

At step 212, the receiving device modulates the carrier frequency with the receiving device's communication (e.g. the voice call). Then at step 214, the receiving device transmits the modulated communication on the assigned voice channel with a TX deviation. In one embodiment, the receiving device is preprogrammed with a TX deviation of a maximum of 4 kHz for communications on channels 440 to 559. As is known to one of ordinary skill in the art, a TX deviation of a maximum of 4 kHz means to shift the carrier frequency by Frequency Modulation (FM) to within +/−4 kHz. As is known to one of ordinary skill in the art, the receiving device may transmit using a higher transmit deviation but doing so causes interference in adjacent channels and audio dropouts in receiving devices due to improper activation of receiver squelch circuitry. Further, the receiving device may transmit with a lower transmit deviation but doing so may cause unreliable operation of subaudible decoders in associated receivers and low receive audio volume. Finally, by transmitting, the receiving device is able to communicate in the trunked radio communications system 100.

Further, once the receiving device has transmitted on about the TX frequency, the receiving device moves to a RX frequency that is about 45 MHz from the TX frequency to receive communications in the trunked radio communications system 100 that relate to the assigned voice channel number. Further, once a communication is started, e.g. a receiving device starts a call, other receiving devices that need to receive the communication should move to a RX frequency that is related to the assigned voice channel number.

In one embodiment, the receiving device determines the RX frequency by adding 45 MHz to the TX frequency. As is known in the art, if the receiving device is concerned with receiving communications and is not concerned with transmitting communications, then the receiving device may determine the RX frequency by performing the following calculation to arrive at a receive frequency without first determining the TX frequency, e.g. by performing the TX frequency calculation.

$$RX \text{ frequency} = \text{Base Frequency} + [(N-440)*\text{Channel Spacing}]$$

In the above equation, the Base Frequency relates to the lowest frequency that a repeater in the system 100 utilizes for transmissions. For channels between 440 and 559, the lowest frequency that a repeater in the system 100 utilizes for transmission is 851.0250 MHz. As such, the Base Frequency relates to 851.0250 MHz. The other variables are as described above with relationship to the TX frequency calculation.

In one embodiment, the receiving device performs a look-up in a list, e.g. stored in memory in the receiving device, that maps voice channel numbers to RX frequencies. In such an embodiment, each RX frequency may be stored in hexadecimal format. In any case, the receiving device performs a mapping as follows in one embodiment:

| Channel Number | RX Frequency (MHz) |
|---|---|
| 500 | 852.5250 |
| 501 | 852.5500 |
| 502 | 852.5750 |
| 503 | 852.6000 |
| 504 | 852.6250 |
| 505 | 852.6500 |
| 506 | 852.6750 |
| 507 | 852.7000 |
| 508 | 852.7250 |
| 509 | 852.7500 |
| 510 | 852.7750 |
| 511 | 852.8000 |
| 512 | 852.8250 |
| 513 | 852.8500 |
| 514 | 852.8750 |

Regardless of how the receiving device determines the RX frequency, the receiving device tunes to about the RX frequency to receive communications of the trunked radio communications system.

In summary, the present invention provides a method for operating in an 800 MHz trunked radio communications system. It requires the receiving device to determine TX and/or RX frequencies that relate to an assigned voice channel for channel numbers 440 to 559.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a trunked radio communications system operating in the 800 MHz spectrum, wherein the trunked radio communications system comprises at least one site, at least one control channel, at least one voice channel, and a plurality of receiving devices, a method for operating by mapping channels to frequencies, the method comprising the steps of:
   at a receiving device in the trunked radio communications system:
      receiving a voice channel number, wherein the voice channel number is communicated in an outbound signaling message defined by Motorola's 3600-baud radio trunking protocol; and
      tuning to about a transmit frequency of 806.0250 MHz, if the voice channel number is 440;
      tuning to about a transmit frequency of 806.0500 MHz, if the voice channel number is 441;
      tuning to about a transmit frequency of 806.0750 MHz, if the voice channel number is 442;
      tuning to about a transmit frequency of 806.1000 MHz, if the voice channel number is 443;
      tuning to about a transmit frequency of 806.1250 MHz, if the voice channel number is 444;
      tuning to about a transmit frequency of 806.1500 MHz, if the voice channel number is 445;
      tuning to about a transmit frequency of 806.1750 MHz, if the voice channel number is 446;
      tuning to about a transmit frequency of 806.2000 MHz, if the voice channel number is 447;
      tuning to about a transmit frequency of 806.2250 MHz, if the voice channel number is 448;
      tuning to about a transmit frequency of 806.2500 MHz, if the voice channel number is 449;
      tuning to about a transmit frequency of 806.2750 MHz, if the voice channel number is 450;
      tuning to about a transmit frequency of 806.3000 MHz, if the voice channel number is 451;
      tuning to about a transmit frequency of 806.3250 MHz, if the voice channel number is 452;
      tuning to about a transmit frequency of 806.3500 MHz, if the voice channel number is 453; and
      tuning to about a transmit frequency of 806.3750 MHz, if the voice channel number is 454.

2. The method of claim 1 further comprising:
   modulating the communication to about the transmit frequency; and
   transmitting the modulated communication with a transmit deviation that relates to a maximum of 4 kHz.

3. The method of claim 1 wherein the receiving device is at least one of a subscriber, a subscriber unit, a radio, a mobile, a portable, a receiver, a scanner, and a scanner device.

4. The method of claim 1 further comprising receiving at a receive frequency which is 45 MHz from the transmit frequency.

5. The method of claim 4 wherein the receive frequency is calculated by adding 45 MHz to the transmit frequency.

6. In a trunked radio communications system operating in the 800 MHz spectrum, wherein the trunked radio communications system comprises at least one site, at least one control channel, at least one voice channel, and a plurality of receiving devices, a method for operating by mapping channels to frequencies, the method comprising the steps of:
   at a receiving device in the trunked radio communications system:
      receiving a voice channel number, wherein the voice channel number is communicated in an outbound signaling message defined by Motorola's 3600-baud radio trunking protocol; and
      tuning to about a transmit frequency of 806.7750 MHz, if the voice channel number is 470;
      tuning to about a transmit frequency of 806.8000 MHz, if the voice channel number is 471;
      tuning to about a transmit frequency of 806.8250 MHz, if the voice channel number is 472;
      tuning to about a transmit frequency of 806.8500 MHz, if the voice channel number is 473;
      tuning to about a transmit frequency of 806.8750 MHz, if the voice channel number is 474;
      tuning to about a transmit frequency of 806.9000 MHz, if the voice channel number is 475;
      tuning to about a transmit frequency of 806.9250 MHz, if the voice channel number is 476;
      tuning to about a transmit frequency of 806.9500 MHz, if the voice channel number is 477;
      tuning to about a transmit frequency of 806.9750 MHz, if the voice channel number is 478;
      tuning to about a transmit frequency of 807.0000 MHz, if the voice channel number is 479;
      tuning to about a transmit frequency of 807.0250 MHz, if the voice channel number is 480;
      tuning to about a transmit frequency of 807.0500 MHz, if the voice channel number is 481;
      tuning to about a transmit frequency of 807.0750 MHz, if the voice channel number is 482;
      tuning to about a transmit frequency of 807.1000 MHz, if the voice channel number is 483; and
      tuning to about a transmit frequency of 807.1250 MHz, if the voice channel number is 484.

7. The method of claim 6 further comprising:
   modulating the communication to about the transmit frequency; and
   transmitting the modulated communication with a transmit deviation that relates to a maximum of 4 kHz.

8. The method of claim 6 wherein the receiving device is at least one of a subscriber, a subscriber unit, a radio, a mobile, a portable, a receiver, a scanner, and a scanner device.

9. The method of claim 6 further comprising receiving at a receive frequency which is 45 MHz from the transmit frequency.

10. The method of claim 9 wherein the receive frequency is calculated by adding 45 MHz to the transmit frequency.

11. The method of claim 6 wherein a relationship between the transmit frequency and the voice channel number is stored in memory in the receiving device.

12. The method of claim 6 wherein the transmit frequency is stored in hexadecimal format.

13. The method of claim 6 further comprising performing mathematical operations to arrive at the transmit frequency.

14. In a trunked radio communications system operating in the 800 MHz spectrum, wherein the trunked radio communications system comprises at least one site, at least one control channel, at least one voice channel, and a plurality of receiving devices, a method for operating by mapping channels to frequencies, the method comprising the steps of:

at a receiving device in the trunked radio communications system:

receiving a voice channel number, wherein the voice channel number is communicated in an outbound signaling message defined by Motorola's 3600-baud radio trunking protocol; and tuning to about a receive frequency of 852.5250 MHz, if the voice channel number is 500;

tuning to about a receive frequency of 852.5500 MHz, if the voice channel number is 501;

tuning to about a receive frequency of 852.5750 MHz, if the voice channel number is 502;

tuning to about a receive frequency of 852.6000 MHz, if the voice channel number is 503;

tuning to about a receive frequency of 852.6250 MHz, if the voice channel number is 504;

tuning to about a receive frequency of 852.6500 MHz, if the voice channel number is 505;

tuning to about a receive frequency of 852.6750 MHz, if the voice channel number is 506;

tuning to about a receive frequency of 852.7000 MHz, if the voice channel number is 507;

tuning to about a receive frequency of 852.7250 MHz, if the voice channel number is 508;

tuning to about a receive frequency of 852.7500 MHz, if the voice channel number is 509;

tuning to about a receive frequency of 852.7750 MHz, if the voice channel number is 510;

tuning to about a receive frequency of 852.8000 MHz, if the voice channel number is 511;

tuning to about a receive frequency of 852.8250 MHz, if the voice channel number is 512;

tuning to about a receive frequency of 852.8500 MHz, if the voice channel number is 513; and tuning to about a receive frequency of 852.8750 MHz, if the voice channel number is 514.

15. The method of claim 14 wherein the receiving device is at least one of a subscriber, a subscriber unit, a radio, a mobile, a portable, a receiver, a scanner, and a scanner device.

16. The method of claim 14 wherein a relationship between the receive frequency and the voice channel number is stored in memory in the receiving device.

17. The method of claim 14 wherein the receive frequency is stored in hexadecimal format.

18. The method of claim 14 further comprising performing mathematical operations to arrive at the receive frequency.

19. The method of claim 14 further comprising tuning to about a receive frequency of 853.5500 MHz, if the voice channel number is 541.

20. The method of claim 14 further comprising tuning to about a receive frequency of 854.0000 MHz, if the voice channel number is 559.

* * * * *